Jan. 21, 1958 K. L. SANDERS, JR 2,820,943

MINIMUM TIME DELAY MAGNETIC AMPLIFIER

Filed Oct. 14, 1952 4 Sheets-Sheet 1

INVENTOR.
KEITH L. SANDERS JR.

BY William P. Lane

ATTORNEY

Jan. 21, 1958 K. L. SANDERS, JR 2,820,943

MINIMUM TIME DELAY MAGNETIC AMPLIFIER

Filed Oct. 14, 1952 4 Sheets-Sheet 2

INVENTOR.
KEITH L. SANDERS JR.
BY William R. Lane
ATTORNEY

INVENTOR.
KEITH L. SANDERS JR.
BY
William R. Lane
ATTORNEY

Jan. 21, 1958 K. L. SANDERS, JR 2,820,943

MINIMUM TIME DELAY MAGNETIC AMPLIFIER

Filed Oct. 14, 1952 4 Sheets-Sheet 4

*INVENTOR.*

KEITH L. SANDERS JR.

*BY* William R. Lane

ATTORNEY

United States Patent Office 2,820,943
Patented Jan. 21, 1958

2,820,943

MINIMUM TIME DELAY MAGNETIC AMPLIFIER

Keith L. Sanders, Jr., Paramount, Calif., assignor to North American Aviation, Inc.

Application October 14, 1952, Serial No. 314,623

4 Claims. (Cl. 323—89)

This invention relates to a magnetic amplifier, and in particular to a magnetic amplifier especially suited for use in connection with servo networks.

In the past, because of the superior speed of response of electronic amplifiers, they have been chosen in preference to magnetic amplifiers for use as components of servo systems. Magnetic amplifiers heretofore known, which produce A. C. output or reversible-polarity D. C., have either had a low speed of response or a very low efficiency. Time delay is an inherent characteristic of magnetic amplifiers because of their basic principle of operation. Since a magnetic amplifier always operates with a source of alternating current as its energy source, the minimum response time obtainable from a magnetic amplifier is always a function of the frequency of the alternating current source. This invention contemplates a magnetic amplifier having a maximum time delay of one cycle of supply frequency, which time delay may actually be as small as zero for certain times of initiation of the control signal change. This invention further contemplates a minimum time delay magnetic amplifier having either an A. C. or a polarity-reversible, half-wave, D. C. output, and which may be modified to produce a phase-reversible A. C. output or a polarity-reversible, full-wave, D. C. output.

The time delay of all magnetic amplifiers is a function of both the control circuit and the output circuit. The time delays indicated for the following circuits are possible only if the watt-seconds energy input from the control circuit is capable of supplying the hysteresis and eddy-current losses of the cores for a half-cycle of the supply frequency.

It is therefore an object of this invention to provide a magnetic amplifier having a minimum time delay.

It is another object of this invention to provide a magnetic amplifier having a half-wave, polarity-reversible, D. C. output.

It is another object of this invention to provide a magnetic amplifier having a full-wave, polarity-reversible, D. C. output.

It is another object of this invention to provide a magnetic amplifier having an A. C. output.

It is another object of this invention to provide a magnetic amplifier having a phase-reversible, A. C. output.

It is another object of this invention to provide a magnetic amplifier in which the level of magnetization of the unsaturated cores is not affected by the flow of current through windings associated with the saturated cores.

It is another object of this invention to provide an improved magnetic amplifier.

Other objects of invention will become apparent from the following description taken in connection with the accompanying drawings, in which.

Figure 2:
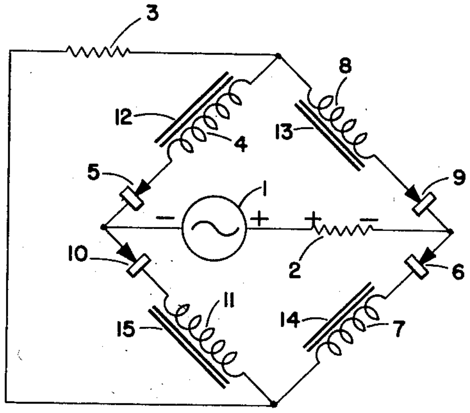
Fig. 2 is a circuit diagram of a simplified form of the invention.

Referring to the drawings, and in particular to Fig. 2, there is shown a circuit diagram of a simplified form of the invention from which control windings for the saturable reactors have been omitted. In Fig. 2, alternating current source 1 supplies current to load 2, represented as a resistor, the circuit being completed either through resistor 3, saturable reactor winding 4, rectifier 5, rectifier 6, and saturable reactor winding 7; or through resistor 3, saturable reactor winding 8, rectifier 9, rectifier 10, and saturable reactor winding 11. In Fig. 2 it is to be noted that windings 4 and 7 may be wound upon a common core, as may windings 8 and 11. Any convenient system of bias and control windings may then be applied to these cores, provided the control energy input is sufficient, it being understood that cores 12, 13, 14, and 15 are of a 50–50 grain-oriented nickel iron alloy material such as Deltamax.

Figure 1:
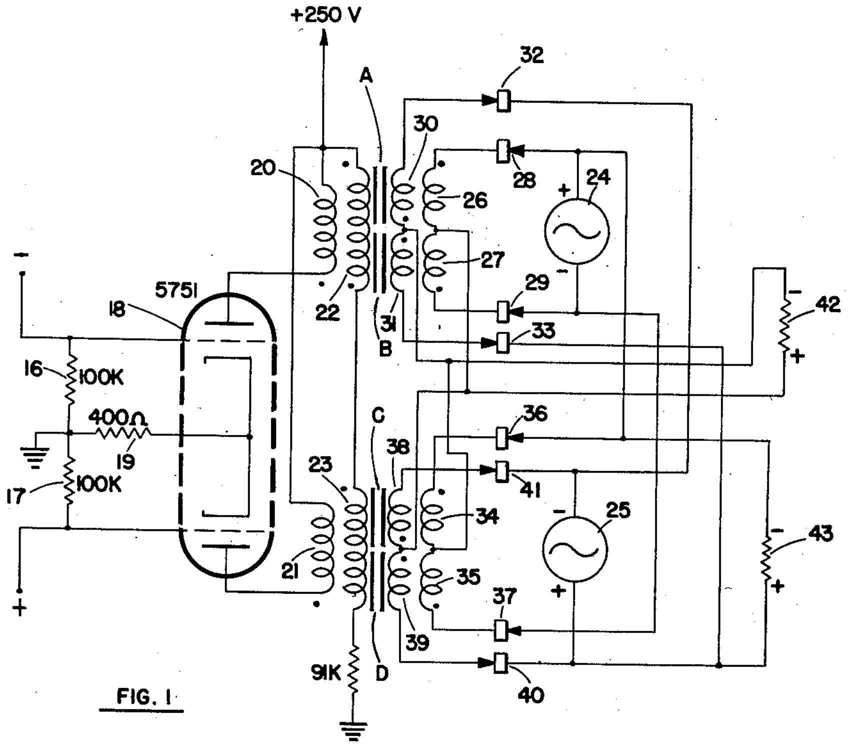
Fig. 1 is a circuit diagram of the invention.

In Fig. 1 is shown the complete circuit of the invention, including control windings for producing a phase-reversible A. C. output or a polarity-reversible, full-wave, D. C. output. In Fig. 1 the control signal is applied across resistors 16 and 17 which are connected to the grids of double triode 18, with resistor 19 as the cathode resistor to ground. Saturable reactor cores A, B, C, and D carry control windings 20 and 21 and bias windings 22 and 23, as shown. Each core has two separate load windings, which windings are supplied with alternating current from courses 24 and 25. Load windings 26 and 27 are connected to source 24 by rectifiers 28 and 29. Load windings 30 and 31 are supplied with alternating current from source 25 through rectifiers 32 and 33. Load windings 34 and 35 are supplied with alternating current from source 24 by rectifiers 36 and 37, while load windings 38 and 39 are connected to source 25 through rectifiers 40 and 41. Load 42 is connected to all load windings as shown, and is represented in Fig. 1 as a resistor. Resistor 43 is connected as shown and has a resistance equal to the resistance of load 42.

Figure 3:
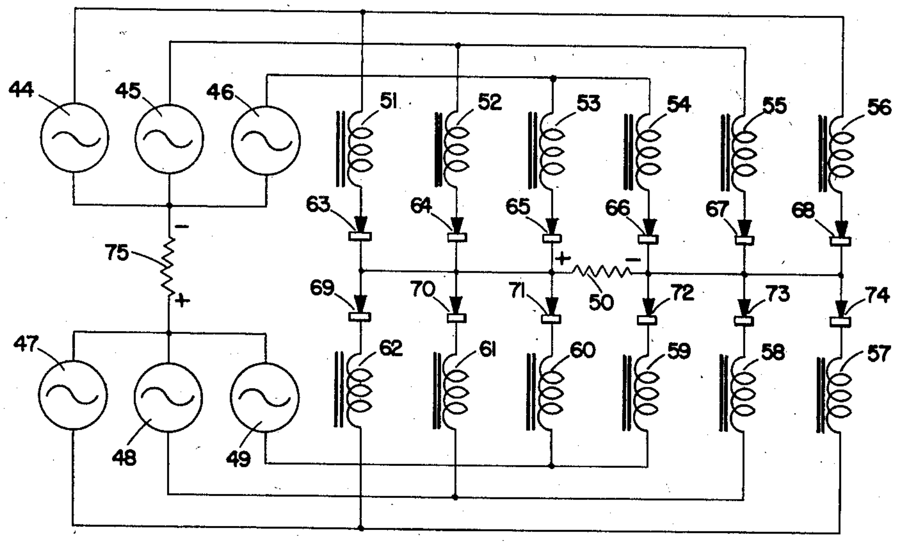
Fig. 3 is a circuit diagram of a modified form of the invention.

Referring now to Fig. 3, there is shown a magnetic amplifier having a full-wave rectifier direct-current output of reversible polarity powered by a pair of three-phase alternating current sources. The circuit of Fig. 3 is a logical extension of the circuit shown in Figs. 1 and 2, and is useful where it is desired to provide the load with a minimum of A.-C. ripple. In Fig. 3, sources 44, 45 and 46 comprise a three-phase source of alternating current; while sources 47, 48, and 49 comprise a second three-phase source of alternating current. Electrical load 50 is supplied with direct current by a network of saturable reactors and rectifiers including saturable reactors 51, 52, 53, 54, 55, 56, 57, 58, 59, 60, 61, and 62, and rectifiers 63, 64, 65, 66, 67, 68, 69, 70, 71, 72, 73, and 74. External resistance 75, equal to the effective resistance of load 50, is provided between three-phase sources as shown.

Referring now to Fig. 2, a simplified form of the device functions as follows. During the half cycle of the supply voltage indicated by the polarities shown in Fig. 2, let it be assumed that cores 12 and 14 are saturated, permitting source 1 to drive a current through load 2, rectifier 6, winding 7, resistor 3, winding 4, and rectifier 5. Since the action of rectifiers 9 and 10 prevents current flow through windings 8 and 11, these cores during this half cycle are being reset. That is, the energy supplied by the control windings is being made effective in desaturating cores 13 and 15. During the succeeding half cycle, rectifiers 5 and 6 prevent current flow through windings 4 and 7, but rectifiers 9 and 10 allow the full output of source 1 to be applied to windings 8 and 11. However, since cores 13 and 15 have been, in the previous half cycle, reset, the entire half cycle is used up in magnetizing cores 13 and 15. Thus, as the succeeding half cycles come and go, cores 13 and 15 are successively magnetized and reset as long as the control winding associated therewith does not raise the level of magnetization to the point where at the beginning of a half cycle similar to the one represented by the polarities shown in Fig. 2 there is any magnetization of the cores. The result is that load 2 has applied to it a pulsating direct current. Now, if equal control signal is applied to each pair of cores by any conventional means so that these cores are not completely reset at the end of any reset portion of the cycle, the device functions to supply load 2 with an alternating current output, since during one half-cycle, windings 4 and 7 conduct, and during the next half cycle, windings 8 and 11 conduct.

It will be noted that load 2 always has applied to it a voltage equal to one-half the supply voltage, assuming the forward resistance of all rectifiers at zero, and assuming no voltage drop in the saturable reactor windings when they are saturated. Likewise, one-half the voltage output of source 1 appears as a voltage drop across resistor 3. The efficiency of the device is therefore fifty percent, since resistor 3 represents a dummy load unless, as is the case with the application of this invention to certain motor controls, resistor 3 may be made a useful load. If resistor 3 is not made equal in resistance to the resistive component of load 2 but is of lower resistance, the efficiency of the circuit is correspondingly greater than fifty percent. The response time of the device, however, may no longer be predicted by reference to the curves of Fig. 4 as hereinafter related, and is, in general, greater than when resistor 3 is equivalent in resistance to the load.

Now when the control current is changed in the manner necessary to stop current flow through load 2, cores 12 and 14 are caused to reset at the next opportunity ordinarily presented in the cycle of operation. For instance, in the half cycle indicated by the polarities shown in Fig. 2, cores 12 and 14 are saturated, and windings 4 and 7 are conducting. If at the end of this half cycle the control current is changed in the direction required to reduce the current through load 2 to zero, cores 12 and 14 are reset during the succeeding half cycle; and during the next succeeding half cycle, windings 4 and 7 do not conduct because the entire half cycle is spent in the process of magnetizing cores 12 and 14. Thus, if a transient is initiated in the control circuit of the arrangement of the invention shown in Fig. 2 at the end of the half cycle represented by the polarities shown in Fig. 2, and if prior to the transient, cores 13 and 15 are magnetizing and resetting every cycle of the supply frequency as previously assumed, thus supplying load 2 with pulsating direct current, there is, in effect, a zero time delay; or, in other words, the current through load 2 immediately ceases. If, however, the transient is initiated at the beginning of the half cycle represented by the polarities shown in Fig. 2, windings 4 and 7 continue to conduct throughout the half cycle, are reset the following half cycle, and do not conduct the next succeeding half cycle. Thus, when the transient is initiated at the beginning of the half cycle indicated in Fig. 2 there is a one-half cycle delay between the initiation of the transient and the reflection of the transient in the current through the load.

Thus, it is seen that the time delay with the circuit shown in Fig. 2 is a function of the time during the supply frequency cycle when the transient is initiated, and if sufficient power is applied to the control circuit, the time delay is substantially independent of the control circuit.

The importance of resistor 3 stems from the fact that in any magnetic amplifier circuit, in order to effect a flux change in the cores thereof, current must flow in one winding associated with a core of a saturable reactor while current is prevented from flowing in other windings associated therewith. In the typical case, the core carries two windings: the first a control winding, and the second a load winding. Whenever control current is applied to a saturable reactor core, the purpose is to change the level of magnetization or position of the core on the BH loop of the particular material used for the core. During the time when it is desired to effect a change in magnetization by means of control current, therefore, the current in the load winding should effectively be reduced to zero. In Fig. 2, the voltage drop across load 2 is one-half of the supply voltage, while the voltage drop across resistor 3 is one-half the supply voltage. Considering for a moment the branch of the circuit including winding 4, it is seen that when a transient is initiated in the control winding associated with core 12 to stop the flow of current in winding 4, it is necessary to induce a voltage equal to one-half the supply voltage in winding 4. If this voltage results in current flow, no change in the flux level in the core is effected. However, in Fig. 2, resistor 3 provides a bucking voltage drop resulting in a zero current due to induced voltage in winding 4 when the control current is changed. Accordingly, any one of the cores associated with the device shown in Fig. 2 may be reset within one cycle or less, of the supply frequency.

The embodiment of the device shown in Fig. 2 provides a half-wave rectified D.-C. output, while the device shown in Fig. 1 yields a full-wave rectified D.-C. output. In addition, the device depicted in Fig. 1 includes an arrangement of control windings and circuitry which could be used without substantial modification in connection with the device shown in Fig. 2 for A.-C. output. For D.-C. output, a well known arrangement of control windings utilizing alternating current may be used in connection with the device of Fig. 2. In Fig. 1, the input signal is applied across resistors 16 and 17 as shown. With the polarities shown, the lower half of double triode 18 conducts, while the upper half of triode 18 either does not conduct or conducts only to a smaller extent than does the lower half thereof. The upper half of triode 18 controls the flow of control current through control winding 20, while the lower half of triode 18 controls the flow of control current through control winding 21. Bias windings 22 and 23 are connected between the B+ supply for triode 18 and ground, and provide magnetization to cancel the effect of rectifier leakage in the load circuits of the magnetic amplifier. The windings on each of saturable cores A, B, C, and D are arranged so that saturation is produced by current flowing in the load windings, and resetting is accomplished by currents flowing in the control windings. Consequently, for full output of load windings such as windings 26, 27, 30, 31, 34, 35, 38, and 39, virtually no control current is required to flow. In one embodiment of the invention actually constructed, full output of the load windings was achieved with a current of only .3 milliampere in the control windings, while load current was virtually prevented by a control winding current of 1.8 milliamperes. Assuming a signal applied to the grids of triode 18, as shown, control current flows in winding 21 but does not flow in winding 20. When control current flows in winding 21, cores C and D merely successively magnetize and reset each cycle of the supply voltage from sources 24 and 25. The magnetic amplifier of which cores C and D are parts therefore remains quiescent with negligible output. Control current does not, however, flow in control winding 20 because the upper grid of triode 18 is at too negative a potential to allow substantial current flow through the tube. Cores A and B are therefore saturated, and windings 26, 27, 30, and 31 conduct freely, supplying current to load 42 on one half-cycle from source 24 and on the succeeding half cycle from source 25, but always in the same direction through load 42 so that load 42 always receives full-wave rectified direct current for the particular grid signal polarity indicated above. Of course, the input signal potentials to the grids of triode 18, in general, vary so that the extent of saturation of cores A and B, and hence the time of conduction during any one half-cycle of the supply frequency is varied in response to the input signal, with the result that the current through load 42 is a function of the signal impressed upon the grids of triode 18.

When the signal upon the grids of triode 18 is reversed, control current no longer flows in winding 21, but does flow in winding 20. Accordingly, cores A and B successively magnetize and reset every cycle of the supply frequency, while cores C and D remain saturated. Current therefore flows first from source 24 and then from source 25 through load 42 in the opposite direction from the direction of current flow when cores A and B are saturated and cores C and D are successively magnetizing and resetting. Again, the output is full-wave rectified direct current.

When a transient is initiated in the control circuit, the level of magnetization of cores A, B, C, and D may be quickly changed, because resistance 43 presents a bucking voltage drop to the voltage which tends to be induced in each of the load windings when a change of current is effected in the control windings. The load current windings therefore do not carry current due to the induced voltage which occurs when there is a current change in the control windings.

Figure 4:
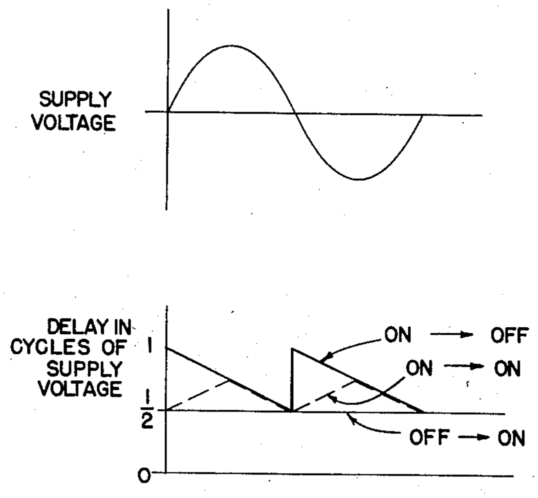
Fig. 4 is a plot of the time delay characteristics of the circuit shown in Fig. 1.

Fig. 4 depicts the delay in cycles of the supply frequency plotted against time at which the control current transient is initiated with reference to the supply voltage cycle. From Fig. 4 it is seen that the maximum time delay of the magnetic amplifier shown in Fig. 1 is one cycle of the supply frequency, and that this one-cycle delay is only incurred if the transient is of the type which shuts the magnetic amplifier off and is initiated either at the beginning of the positive-going half cycle of the supply voltage or at the beginning of the negative-going half cycle of the supply voltage.

The arrangement of the invention shown in Fig. 3 is, functionally, virtually identical to that shown in Fig. 1, with the exception that the control windings have been omitted for the sake of clarity, and with the further exception that the circuit is designed to yield a three-phase rectified direct current output from a three-phase supply voltage source. The circuit has the advantage that the direct current through the load is somewhat smoother than that through the load in the device shown in Fig. 1.

The operation of the device shown in Fig. 3 is also similar to that shown in Fig. 1. For instance, if the control winding associated with the cores upon which windings 51, 52, 53, 57, 58, and 59 are wound carry little or no current, these cores will saturate. During the positive half cycle of the voltage due to source 44, the core upon which winding 51 is wound conducts for from 30 degrees to 150 degrees (referred to the beginning of the half cycle) of the supply voltage cycle, while winding 58 conducts for the first 60 degrees of this period, and winding 59 conducts for the second 60 degrees of this period. If the same control winding controls the cores with which windings 54, 55, 56, 60, 61, and 62 are associated, and if the other set of control windings controls the cores with which windings 51, 52, 53, 57, 58, and 59 are associated, it is seen that three of the former cores reset, while the other three magnetize; and that all of the cores with which windings 54, 55, 56, 60, 61, and 62 are associated successively magnetize and reset during each cycle of the supply voltage, while the cores with which windings 51, 52, 53, 57, 58, and 59 are associated remain saturated and conduct during successive portions of the supply voltage cycle.

A similar time delay may be achieved with respect to the device shown in Fig. 3 as is achieved with respect to the device shown in Fig. 1. In no case does the time delay between the initiation of any transient in the control circuit and the reflection of that transient in the load circuit exceed one cycle of the supply voltage.

Figure 5:
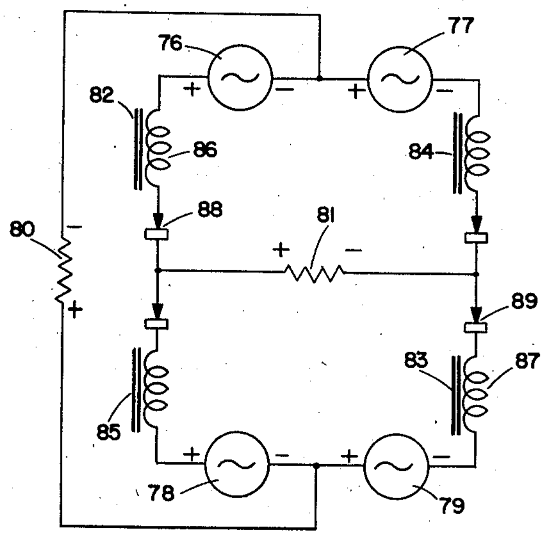
Fig. 5 is a circuit diagram of a modified form of the invention shown in Fig. 2.
Figure 6:
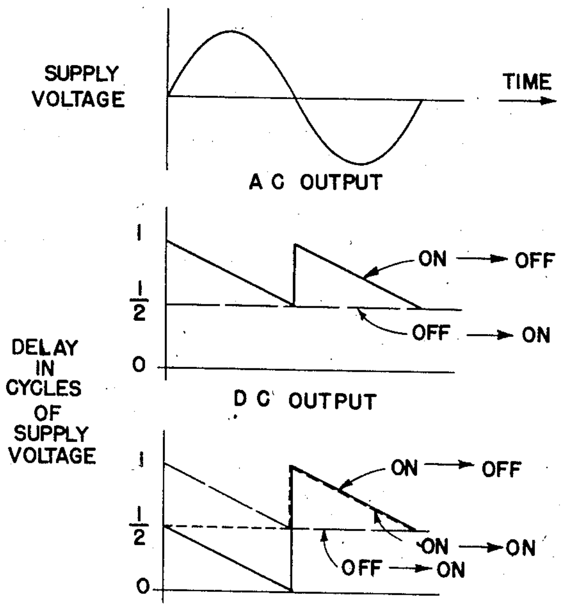
Fig. 6 is a plot of time delay versus time at which a transient is initiated with reference to the supply voltage cycle for the embodiment of the invention shown in Fig. 5.

Referring to Fig. 5, there is shown an embodiment of the invention functionally very similar to the device shown in Fig. 2. In Fig. 5, alternating current sources 76, 77, 78, and 79 perform the function of alternating current source 1 in Fig. 2. Sources 76, 77, 78, and 79 must supply equal voltages, and may be two center-tap windings on a single transformer. Resistor 80 must be equal to the resistive component of load 81 in the same way as resistor 3 must equal the resistive component of load 2 in Fig. 2. In Fig. 5, if cores 82 and 83 are saturated, while cores 84 and 85 are caused to successively magnetize and reset each cycle of supply voltage, with the instantaneous polarities shown in Fig. 5, windings 86 and 87 conduct, with current flowing from source 76 through winding 86, rectifier 88, load 81, rectifier 89, winding 87, source 79, and resistor 80. On the succeeding half cycle, windings 86 and 87 do not conduct because of the presence and orientation of rectifiers 88 and 89. The output is therefore half-wave D.-C. If A.-C. output is desired, of course, it is only required to allow all cores to saturate, in which case load 81 receives alternating current. The delay in cycles of the supply voltage experienced by load 81 for various times of initiation of a transient in the control circuit are plotted in Fig. 6.

Figure 7:
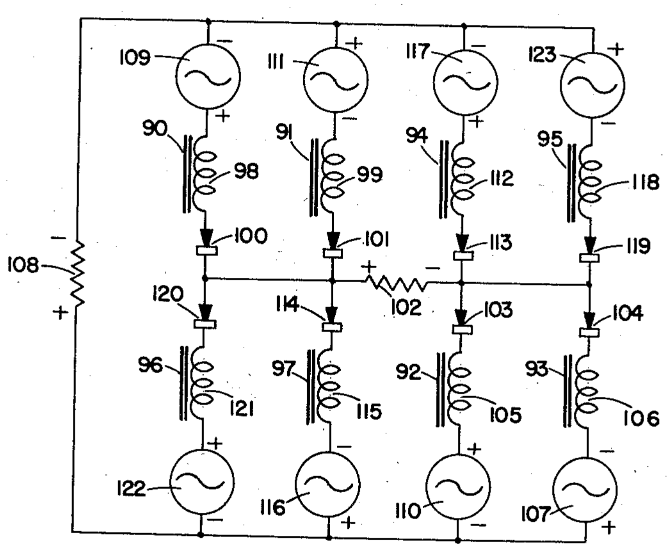
Fig. 7 is a circuit diagram of a modified form of the device shown in Fig. 1.

Referring now to Fig. 7, there is shown a somewhat modified form of the invention shown in Fig. 1, in that eight sources of alternating current are employed rather than two. In Fig. 7, if cores 90, 91, 92, and 93 are saturated by an appropriate set of control windings similar to those shown in connection with Fig. 1, and if cores 94, 95, 96, and 97 successively magnetize and reset on successive half cycles of the supply voltage, with the instantaneous polarities of the supply voltage indicated in Fig. 7, current is allowed to flow through winding 98, rectifier 100, load 102, rectifier 104, winding 106, source 107, resistor 108, and source 109. On the succeeding half cycle, current flows through winding 99, rectifier 100, load 102, rectifier 103, winding 105, source 110, resistor 108, and source 111. Thus, a full-wave output is achieved. If it is desired to reverse the polarity of the full-wave output, the control voltage is reversed so that cores 94, 95, 96, and 97 saturate, and cores 90, 91, 92, and 93 successively magnetize and reset on each cycle of the supply voltage. With cores 94, 95, 96, and 97 saturated, current flows in the reverse direction through load 102 on one half cycle; through winding 112, rectifier 113, load 102, rectifier 114, winding 115, source 116, resistor 108, and source 117 during one half cycle; and through winding 118, rectifier 119, load 102, rectifier 120, winding 121, source 122, resistor 108, and source 123 on the next succeeding half cycle. Sources 107, 109, 110, 111, 116, 117, 122, and 123 may be transformer secondary windings.

Figure 8:
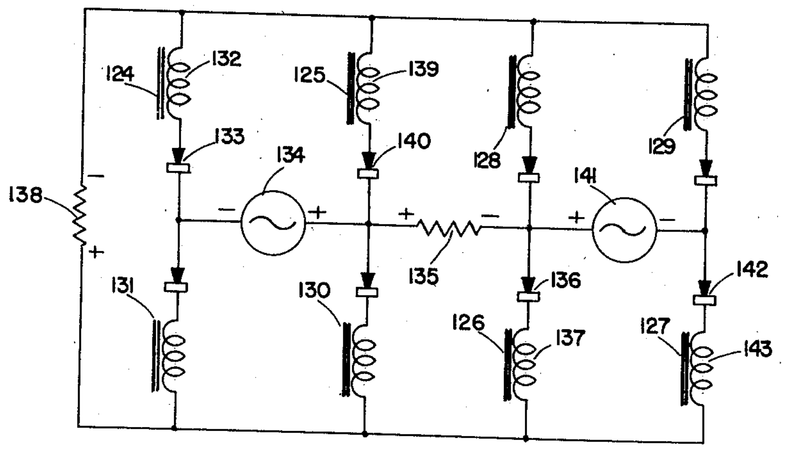
Fig. 8 is a circuit diagram of a second modified form of the invention shown in Fig. 1.

In the embodiment of the invention shown in Fig. 8, if cores 124, 125, 126, and 127 are saturated, while cores 128, 129, 130, and 131 successively magnetize and reset on successive half cycles of the supply voltage, current flows through winding 132, rectifier 133, source 134, load 135, rectifier 136, winding 137, and resistor 138 during the half cycle of the supply voltage indicated by the instantaneous polarities shown in Fig. 8. During the next succeeding half cycle, however, current flows through winding 139, rectifier 140, load 135, source 141, rectifier 142, winding 143, and resistor 138. The output is therefore full-wave D.-C. Control windings of the same type as are shown in connection with Fig. 1 are required for use in connection with the embodiment of the device shown in Fig. 8, and reversing the polarity of the output is achieved by reversing the sign of the input in the same manner as in connection with the device shown in Fig. 1. Alternating current output is obtained by allowing all cores to saturate.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A minimum time delay magnetic amplifier comprising a source of alternating current, an electrical load having a predeterminable effective resistance connected at one end thereof to one terminal of said alternating current source, a resistor equal in resistance to said load effective resistance, a pair of saturable reactors each connected by one of its terminals to one end of said resistor, a rectifier connecting the other terminal of one of said saturable reactors to the other terminal of said alternating current source, a rectifier connecting the other terminal of the other of said saturable reactors to the other end of said electrical load, means including a pair of unidirectional devices for coupling the other end of said resistor to said other source terminal and to the other end of said load, and electrical means associated with said saturable reactors for controlling the magnetic saturation of the cores of said saturable reactor to thereby provide a minimum time delay magnetic amplifier.

2. Magnetic amplifier means comprising a first current path including in series connection a winding of a first saturable core reactor, a first rectifier, a source of alternating current, an electrical load, a second rectifier oriented for current flow in the same direction as said first rectifier, a winding of a second saturable core reactor, and a resistor having a resistance equal to the resistance of said load; a second current path including said resistor, a winding of a third saturable core reactor, a third rectifier, said load, said source of alternating current, a fourth rectifier, a winding of a fourth saturable core reactor; the rectifiers of said two current paths being oriented to allow current flow through said load in opposite directions on alternate half cycles of said alternating current source; and means for controlling the level of saturation of the cores of said saturable core reactors to thereby furnish said load with alternating current in response to said control means.

3. Magnetic amplifier means for supplying to a two-terminal load with polarity-reversible direct current or phase-reversible alternating current from two coordinated sources of alternating current comprising a first pair of saturable reactor controlled current paths for delivering current in one direction through said load for each half cycle of said alternating current, a second pair of saturable reactor controlled current paths for delivering current in the other direction through said load for each half cycle of said alternating current; and a resistor having a resistance equivalent to said load connected in both said paths for presenting a bucking voltage drop to transient-induced voltages in said paths to thereby minimize the time delay incident to said transients.

4. A minimum time delay magnetic amplifier comprising a source of alternating current, an electrical load having a predeterminable effective resistance connected at one end thereof to one terminal of said alternating current source, a resistor equal in resistance to said load effective resistance, a pair of saturable reactors each connected by one of its terminals to one end of said resistor, a rectifier connecting the other terminal of one of said saturable reactors to the other terminal of said alternating current source, a rectifier connecting the other terminal of the other said saturable reactors to the other end of said electrical load, a second pair of saturable reactors each connected by one of its terminals to the other end of said resistor, and rectifiers connecting each of the other terminals of said second pair of saturable reactors to the other terminal of said source and to the other end of said load respectively, said rectifiers being oriented to allow current flow in either direction through said electrical load to thereby provide a minimum time delay magnetic amplifier having either an A.-C. or D.-C. output.

References Cited in the file of this patent

UNITED STATES PATENTS

| | | |
|---|---|---|
| 2,403,891 | Lamm | July 9, 1946 |
| 2,636,150 | McKenney et al. | Apr. 21, 1953 |
| 2,683,853 | Logan | July 13, 1954 |
| 2,688,724 | Newell | Sept. 7, 1954 |
| 2,707,764 | Mittag | May 3, 1955 |

OTHER REFERENCES

Publication entitled "An Improved Magnetic Servo Amplifier," by C. W. Lufcy et al., AIEE Transactions, September 1952, vol. 71, part I, pp. 281–289, by C. W. Lufcy, A. E. Schmid, and P. W. Barnhard.